United States Patent [19]

Gaborski

[11] Patent Number: 5,052,044
[45] Date of Patent: Sep. 24, 1991

[54] CORRELATED MASKING PROCESS FOR DESKEWING, FILTERING AND RECOGNITION OF VERTICALLY SEGMENTED CHARACTERS

[75] Inventor: Roger S. Gaborski, Pittsford, N.Y.

[73] Assignee: Eastman Kodak Company, Rochester, N.Y.

[21] Appl. No.: 474,606

[22] Filed: Feb. 2, 1990

[51] Int. Cl.$^5$ .............................................. G06K 9/74
[52] U.S. Cl. ...................................... 382/32; 382/30; 382/34; 382/12; 235/462
[58] Field of Search ........................ 382/30, 32, 34, 12; 235/462, 463, 495

[56] References Cited

U.S. PATENT DOCUMENTS

| | | | |
|---|---|---|---|
| 3,044,696 | 7/1962 | Feissel | 235/462 |
| 3,283,303 | 11/1966 | Cerf | 235/462 |
| 3,309,667 | 3/1967 | Feissel et al. | 340/146.3 |
| 3,423,730 | 1/1969 | Smyth | 340/146.3 |
| 3,539,989 | 11/1970 | Hanchett, Jr. et al. | 340/146.3 |
| 3,644,889 | 2/1972 | Skenderoff et al. | 382/32 |
| 3,688,955 | 9/1972 | L'Huillier | 235/61.11 F |
| 3,717,848 | 2/1973 | Irvin et al. | 340/146.3 Q |
| 4,053,737 | 6/1976 | Lafevers et al. | 235/61.11 D |
| 4,185,271 | 1/1980 | Izawa et al. | 340/146.3 AG |
| 4,239,151 | 12/1980 | Enser et al. | 235/462 |
| 4,282,426 | 8/1981 | Neseem et al. | 235/463 |
| 4,513,440 | 4/1985 | Delman | 382/30 |
| 4,567,610 | 1/1986 | McConnell | 382/18 |
| 4,736,437 | 3/1988 | Sacks et al. | 382/34 |
| 4,806,741 | 2/1989 | Robertson | 235/462 |
| 4,809,344 | 2/1989 | Peppers et al. | 382/32 |
| 4,949,392 | 5/1989 | Barski et al. | 382/30 |

Primary Examiner—Leo H. Boudreau
Assistant Examiner—Rohini Khanna
Attorney, Agent, or Firm—Dennis R. Arndt

[57] ABSTRACT

Vertically segmented characters are pre-processed for optical character recognition so as to remove skew and noise by convolution with a mask consisting of parallel vertical lines with a one-pixel spatial frequency. The horizontal alignment of the mask with respect to each segmented character is adjusted until a maximum cross-correlation is found. Then, the product of the mask and the character image is formed. A histogram of the number of pixels in the product image along each vertical line of the mask is compared with a library of such histograms of known symbols and the best match identifies the symbol represented by the character image. Alternatively, the histogram is converted to a binary codeword which is compared with a library of such codewords corresponding to a set of known symbols.

20 Claims, 2 Drawing Sheets

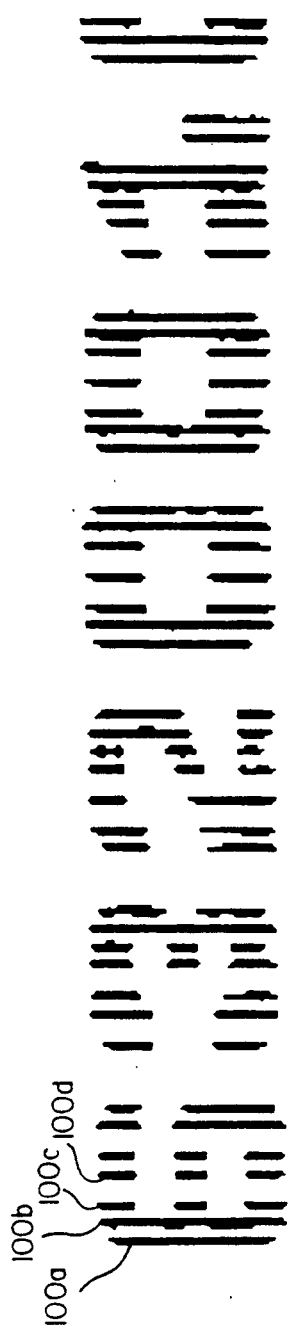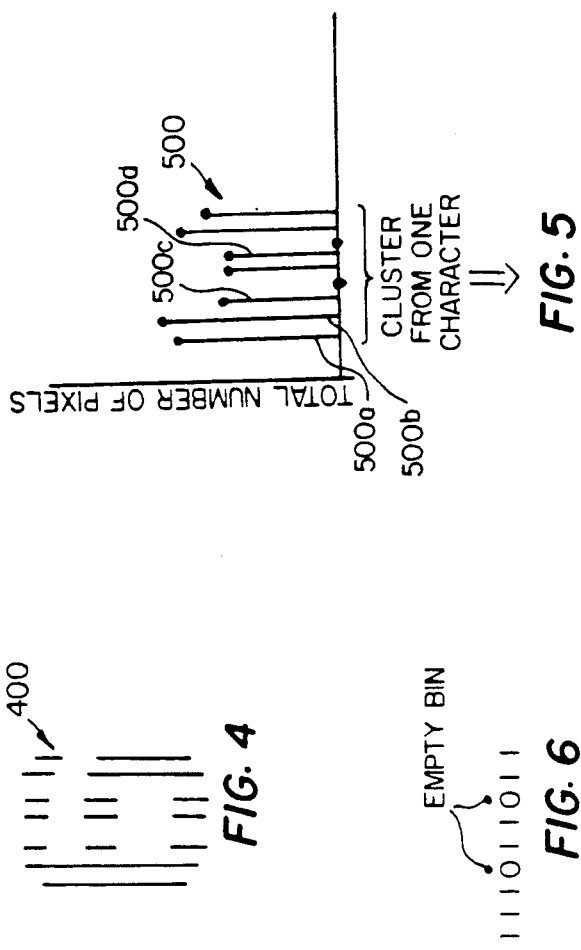

CORRELATED MASKING PROCESS FOR DESKEWING, FILTERING AND RECOGNITION OF VERTICALLY SEGMENTED CHARACTERS

BACKGROUND OF THE INVENTION

1. Technical Field:

The invention is related to optical character recognition systems for recognizing vertically segmented characters.

2. Background Art:

Vertically segmented characters are printed on documents such as bank checks, for example, which need symbols which are both eye-readable and machine readable. The vertical segments in a character are conformed to the outline of a particular symbol so that the character is eye-readable, while the pattern of different horizontal spacings between different vertical segments in the character uniquely defines the particular symbol, so that the character is machine-readable. The concept is disclosed in U.S. Pat. No. 3,309,667 to Feissel et al. and U.S. Pat. No. 3,688,955 to L'Huillier.

In order to read such vertically segmented characters from the document, a well-known technique employs peak detection, as disclosed in U.S. Pat. No. 3,539,989 to Hanchett et al. and U.S. Pat. No. 4,053,737 to Lafevers et al. The document image data is scanned horizontally with a narrow vertical window and the pixel density in the window is plotted or stored as a function of horizontal position of the window. The peaks in the plot are located by a peak detector and the pattern of spaces between the peaks is matched with the patterns of known symbols. One advantage of this technique is that the narrowness of the vertical window minimizes the effects of variations in thickness of the vertical segments printed on the document.

One problem is that the image of the vertically segmented character may be skewed or rotated in the plane of the image because the document itself was skewed or was printed crookedly. A skewed image can impair the recognition of the vertically segmented characters. Specifically, as the skew angle increases, the peaks detected by the peak detector are diffused or broadened. This in turn reduces the accuracy with which the distance between peaks can be measured to form a pattern matching that of a known symbol. As the skew angle increases further, at some point the peaks are so broad and shallow that the distances between them cannot be reliably measured, so that their spacing pattern in a given character is poorly defined and characters cannot be distinguished from one another.

It is therefore an object of the invention to distinguish vertically segmented characters without loss of reliability in the presence of skew.

DISCLOSURE OF THE INVENTION

Vertically segmented characters are pre-processed for optical character recognition by convolution with a mask consisting of parallel vertical lines with a short spatial frequency. The horizontal alignment of the mask with respect to each segmented character is adjusted until a maximum cross-correlation is found. Then, the product of the mask and the character image is formed. A histogram of the number of "on" pixels in the product image along each vertical line of the mask is compared with a library of such histograms of known symbols and the best match identifies the symbol represented by the character image.

In the preferred embodiment, the spacing of the vertical lines in the mask is one pixel, but in any case it is must be a common divisor of all possible pixel spacings employed in the patterns of various ones of the vertically segmented characters. In the preferred embodiment, the thickness of the vertical lines in the mask is one pixel, although a greater thickness may be employed in those cases where the thickness of the vertical segments is many pixels.

The advantage of horizontally locating the mask at the point of greatest cross-correlation is that the vertical segments in the character are centered on corresponding ones of the vertical mask lines even if the character is skewed by an unknown amount. The advantage of computing the product of the mask image and the character image is that variations in thickness of the vertical segments in the character are filtered out in the resulting product image. The advantage of computing histograms of "on" pixels along the vertical mask lines is that distinctions between spacings patterns of different characters may be reliably distinguished even in the presence of skew in the character image. This is true even if the skew is so great that the vertical mask lines each intersect more than one vertical character segment.

BRIEF DESCRIPTION OF THE DRAWINGS

The invention is described in detail below by reference to the accompanying drawings, of which:

FIG. 1 is a diagram illustrating an exemplary document image of the machine-readable and eye-readable vertically segmented characters of the prior art which are to be read by apparatus embodying the invention;

FIG. 3 is a diagram illustrating the convolution performed by the system of FIG. 2 of a vertically lined mask with a vertically segmented character from the image of FIG. 1;

FIG. 4 is a diagram of the product of the convolution of FIG. 3;

FIG. 5 is a diagram illustrating the histogram of "on" pixels of the product of FIG. 4; and FIG. 6 is a diagram corresponding to FIG. 5 illustrating a binary codeword constructed from the histogram of FIG. 5.

MODES FOR CARRYING OUT THE INVENTION

Figure 2:
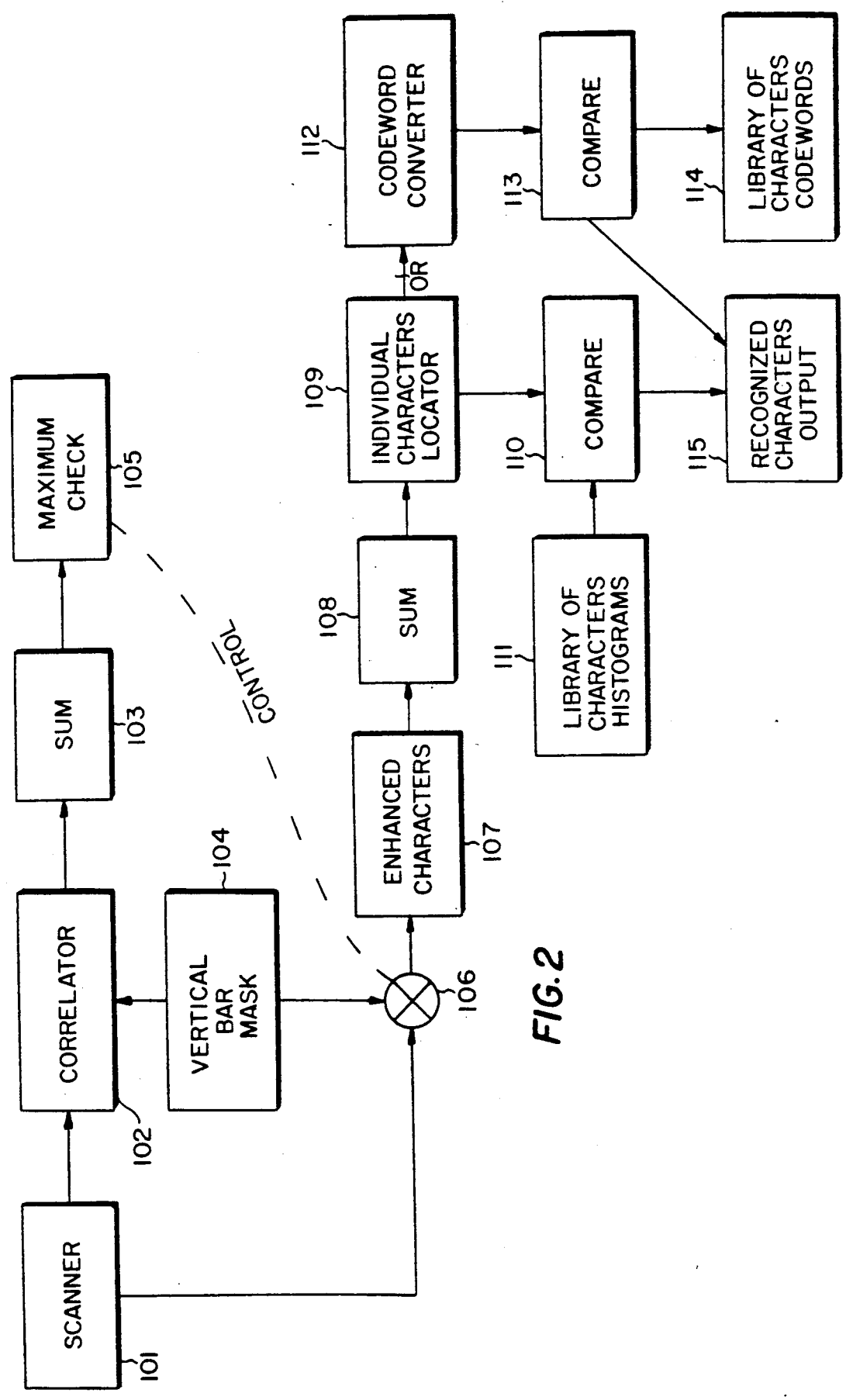
FIG. 2 is a block diagram of a system embodying the invention for reading the characters of FIG. 1.

Referring to FIG. 1, the vertically segmented characters of the type disclosed in U.S. Pat. No. 3,309,667 to Feisel et al. each constitute parallel vertical segments lying between the inner and outer contours of an eye-readable symbol. For example, the number "6" is represented in a document image 100 by vertical segments 100a, 100b, 100c, etc., the ends of each segment touching the inner and outer contours of the number "6". Thus, the length of each segment is selected to make the character eye-readable. The spaces measured horizontally between adjacent segments are different, and define a linear sequence or pattern of spaces which is unique for each symbol. Thus, in the case of a number "6", the space between the first segment pair 100a, 100b is wider than the space between the next segment pair 100b, 100c, while the space between the third segment pair 100c, 100d is greater than either of the other two. The spacing pattern is readily ascertained and matched with a set of known patterns by simple apparatus. Thus, the spaces between each pair of adjacent segments is selected to make the character machine-readable.

A system for reading the characters of FIG. 1 in accordance with the invention is illustrated in FIG. 2. A scanner 101 scans a document of characters of the type illustrated in FIG. 1 and generates a document image. This image preferably is a block of binary data organized in vertical columns and horizontal rows of pixels wherein each binary bit represents a bi-tonal pixel in the image. A correlator 102 computes the product of the document image from the scanner 101 with a mask image 300 consisting exclusively of parallel vertical lines illustrated in FIG. 3 and stored in a memory 104 of FIG. 1. The mask image 300 is preferably another block of binary data organized in vertical columns and horizontal rows of pixels wherein each binary bit represents a pixel in the mask image 300.

As illustrated in FIG. 3, each vertical line 300a, 300b, 300c, etc. of the mask image 300 is one image pixel in thickness. All of the vertical mask lines 300a, 300b, 300c, etc. are uniformly spaced by a distance d equal to the smallest interval between adjacent vertical segments in the characters of FIG. 1. Alternatively, the mask spacing d may be a common divisor of all the different intervals A, B, C, etc. employed in the set of all segmented characters corresponding to FIG. 1. Also, in an alternative embodiment, the width of the vertical mask lines 300a, 300b, 300c, etc. may be greater than one image pixel in those cases where the thickness T of each vertical segment of the characters of FIG. 1 is many image pixels.

In order that the product of the document image 100 and the mask image 300 be useful, the correct horizontal position of the mask image 300 with respect to the document image 100 must first be found. The correct position is one in which each vertical segment 100a, 100b, 100c, etc. is centered on a corresponding one of the vertical mask lines 300a, 300b, 300c, etc., even if the vertical segment is skewed—not parallel—with respect to the mask line. The centering of a skewed vertical segment on a vertical mask line is indicated in dashed line in FIG. 3. To find this correct horizontal position of the mask image 300, the correlator 102 moves the mask image 300 horizontally across the document image 100 in incremental steps and at each step computes the pixel-by-pixel product of the document image 100 and the mask image 300. It should be noted that the direction of movement of the mask image 300 with respect to the document image 100 may not be parallel with the direction of the horizontal pixel rows in the document image 100, particularly if the document image 100 is skewed as shown in FIG. 3. Preferably, the length of each of the incremental steps is a fraction of the spacing d between vertical mask lines.

An exemplary product image 400 thus generated by the correlator 102 is illustrated in FIG. 4. The product image 400 of FIG. 4 was generated by multiplying the binary value of each pixel in the document image 100 with the corresponding pixel in the mask image 300. The product image 400 thus has "on " pixels located along the pixel locations of the vertical mask lines 300a, 300b, 300c, etc. Coincidently, the product image 400 of FIG. 4 corresponds to the "correct" horizontal position of the mask image 300 with respect to the document image 100 in which each vertical character segment 100a, 100b, etc. is centered on a corresponding vertical mask line 300a, 300b, etc. However, it should be understood that at this point the correct horizontal position of the mask image 300 may not necessarily have been achieved.

For each product image 400 generated by the correlator 102 at each incremental step of the mask image 300, an adder 103 computes the sum of the number of "on" pixels along each vertical line 300a, 300b, 300c, of the mask image. As the correlator 102 incrementally steps the mask image 300 across the document image 100, a processor 105 stores the sums for all vertical mask lines 300a, 300b, etc. computed at each incremental step by the adder 103 in corresponding memory bins to form a histogram illustrated in FIG. 5 for each incremental step. After the completion of a number of incremental steps covering at least the longest interval C (FIG. 3) between vertical character segments 100c, 100d, the processor 105 inspects the stored sums and determines at which incremental step the adder 103 generated the greatest sum. The incremental step at which the adder 103 generated the greatest sum is the "correct" horizontal position of the mask image 300 at which each vertical character segment is centered on a corresponding one of the vertical mask lines, as illustrated in FIG. 3.

As soon as the processor 105 has thus identified the "correct" position, it instructs a multiplier 106 to position the mask image 300 from the memory 104 at the correct incremental step with respect to the document image 100 received from the scanner and to multiply the images together to generate the product image of FIG. 4 which is then stored in a memory 107. An adder 108 computes the histogram of FIG. 5 from the product image of FIG. 4. In an alternative embodiment, the multiplier 106 and the adder 108 are eliminated. In this alternative embodiment, the processor 105 selects from all of the histograms it stored for all of the incremental steps of the mask image 300 the histogram 500 having the highest sums in its bins and outputs this histogram. The histogram having the highest sums corresponds to the incremental step of the mask image position in which the vertical character segments of the document image 100 are centered on corresponding vertical mask lines of the mask image 300.

The histogram generated by the adder 108 in the preferred embodiment or selected by the processor 105 in the alternative embodiment is received by a processor 109. The processor 109 separates the histograms of individual characters from those of adjacent characters by searching for a succession of bins having zero or very low values. These bins correspond to empty spaces between adjacent characters in the document image 100 and separate the histograms of individual characters. The processor 109 then transmits the histogram of each individual character to a comparator 110. The comparator 110 computes the cross-correlation between the histogram and each one of a library of reference histograms stored in a memory 111 using pattern matching techniques wellknown in the art. The comparator 110 declares the reference histogram having the highest correlation to be the "winner", thus identifying the character image.

The library of reference histograms is generated in a "program" mode of the system of FIG. 2 by supplying the scanner 101 with a succession of images of known symbols and storing the histograms received by the processor 109 in the memory 111 along with the identities of the corresponding symbols.

In another alternative embodiment of the invention, the processor 109 transmits the histogram of each individual character to a codeword converter 112 instead of the comparator 110. The codeword converter 112 assigns a binary "one" to each one of the bins 500a, 500b, 500c, etc. of the histogram 500 of FIG. 5 having a non-zero "on" pixel count and assigns a binary "zero" to each bin having a zero "on" pixel count. The codeword converter 112 then strings the succession of ones and zeroes together to form codeword 600 illustrated in FIG. 6. A comparator 113 compares the codeword with a library of reference codewords stored in a memory 114. The comparator 113 declares that reference codeword having the highest correlation to the codeword formed by the codeword converter 112 to be the "winner", thus identifying the corresponding character.

The library of reference codewords is generated by the system of FIG. 2 in a "program" mode by supplying the scanner 101 with a succession of images of known characters and storing the codewords formed by the converter 112 in the memory 114.

INDUSTRIAL UTILITY

The invention is useful as a system for deskewing, filtering and reading images of vertically segmented characters of the type which are both eye-readable and machine readable.

While the invention has been described in detail by specific reference to preferred embodiments thereof, it is understood that variations and modifications may be made without departing from the true spirit and scope of the invention.

What is claimed is:

1. An optical character recognition system for reading vertically segmented characters in a document image of parallel horizontal rows and vertical columns of pixels, said system comprising:
   means for defining a mask image comprising a plurality of parallel vertical lines;
   incremental mask stepping means for positioning said mask image at one of a plurality of incremental steps with respect to said document image;
   means for generating a product image by multiplying together corresponding pixels pairs of said document image an said mask image;
   means for determining which one of said steps corresponds to a maximum correlation between said document and mask images;
   means for generating a histogram of said product image corresponding to an incremental step having maximum correlation between said document and mask images; and
   means for determining from said histogram the identity of individual characters in said document image.

2. The system of claim 1 wherein said means for generating a histogram comprises means for computing sums of "on" pixels in plural vertical columns in said product image.

3. The system of claim 2 wherein said means for generating a product image generates a product image for each one of said incremental steps and said means for generating a histogram generates a histogram from the product image of each one of said incremental steps, and wherein said means for determining a maximum correlation comprises:
   means for determining which one of said incremental steps corresponds to the greatest sums computed by said means for computing the sum of "on" pixels.

4. The system of claim 1 wherein said incremental mask stepping means moves said mask image across said document image in a horizontal direction with respect to said parallel vertical mask lines, wherein said vertical mask lines and said vertical character segments are at least nearly parallel to within a skew angle.

5. The system of claim 4 wherein different pairs of adjacent ones of said character segments are separated by different separation lengths and wherein said vertical mask lines are located at spatial intervals d which is a common denominator of said different separation lengths.

6. The system of claim 5 wherein said vertical mask lines have a thickness less than the thickness of said vertical character segments.

7. The system of claim 6 wherein said vertical mask lines have a thickness equal to one pixel and said spatial interval d of said vertical mask lines is one pixel.

8. The system of claim 1 wherein said means for determining said identity of said character comprises:
   means for storing a set of reference histograms; and
   means for comparing each histogram corresponding to said maximum correlation with said set of reference histograms and identifying the reference histogram having the greatest correlation therewith.

9. The system of claim 1 wherein said means for determining said identity of said character comprises:
   means for converting each sum in said histogram corresponding to said maximum correlation to a binary bit and forming an image codeword of the binary bits corresponding to one histogram;
   means for storing a set of reference codewords; and
   means for comparing the image codeword with said set of reference codewords and identifying the reference codeword having the greatest correlation therewith.

10. The system of claim 9 wherein said means for converting to binary bits converts each sum to a one or a zero depending upon whether the sum is non-zero or zero, respectively.

11. The system of claim 2 wherein said plural vertical columns along which said sums of said histograms are computed comprise said vertical mask lines.

12. In an optical character recognition system, a method for reading vertically segmented characters in a document image of parallel horizontal rows and vertical columns of pixels, said method comprising:
   defining a mask image comprising a plurality of parallel vertical lines;
   positioning said mask image at one of a plurality of incremental steps with respect to said document image;
   generating a product image by multiplying together corresponding pixels pairs of said document image and said mask image;
   determining which one of said steps corresponds to a maximum correlation between said document and mask images;
   generating a histogram of said product image corresponding to an incremental step having maximum correlation between said document and mask images; and
   determining from said histogram the identity of individual characters in said document image.

13. The method of claim 12 wherein said step of generating a histogram comprises computing sums of "on" pixels in plural vertical columns in said product image.

14. The method of claim 13 wherein said step of generating a product image comprises generating a product image for each one of said incremental steps and said step of generating a histogram comprises generating a histogram from the product image of each one of said incremental steps, and wherein said step of determining a maximum correlation comprises:

determining which one of said incremental steps corresponds to the greatest sums computed by said step of computing the sum of "on" pixels.

15. The method of claim 12 wherein said incremental mask positioning step comprises moving said mask image across said document image in a horizontal direction with respect to said parallel vertical mask lines, wherein said vertical mask lines and said vertical character segments are parallel to within a skew angle.

16. The method of claim 15 wherein different pairs of adjacent ones of said character segments are separated by different separation lengths and wherein said vertical mask lines are located at spatial intervals d which is a common denominator of said different separation lengths.

17. The method of claim 16 wherein said vertical mask lines have a thickness less than the thickness of said vertical character segments.

18. The method of claim 17 wherein said vertical mask lines have a thickness equal to one pixel and said spatial interval d of said vertical mask lines is one pixel.

19. The method of claim 12 wherein said step of determining said identity of said character comprises:

storing a set of reference histograms; and comparing each histogram corresponding to said maximum correlation with said set of reference histograms and identifying the reference histogram having the greatest correlation therewith.

20. The method of claim 12 wherein said step of determining said identity of said character comprises:

converting each sum in said histogram corresponding to said maximum correlation to a binary bit and forming an image codeword of the binary bits corresponding to one histogram;

storing a set of reference codewords; and comparing the image codeword with said set of reference codewords and identifying the reference codeword having the greatest correlation therewith.

* * * * *